Aug. 19, 1947.  W. G. TENNEY  2,425,764
BATTERY TERMINAL
Filed Oct. 1, 1945
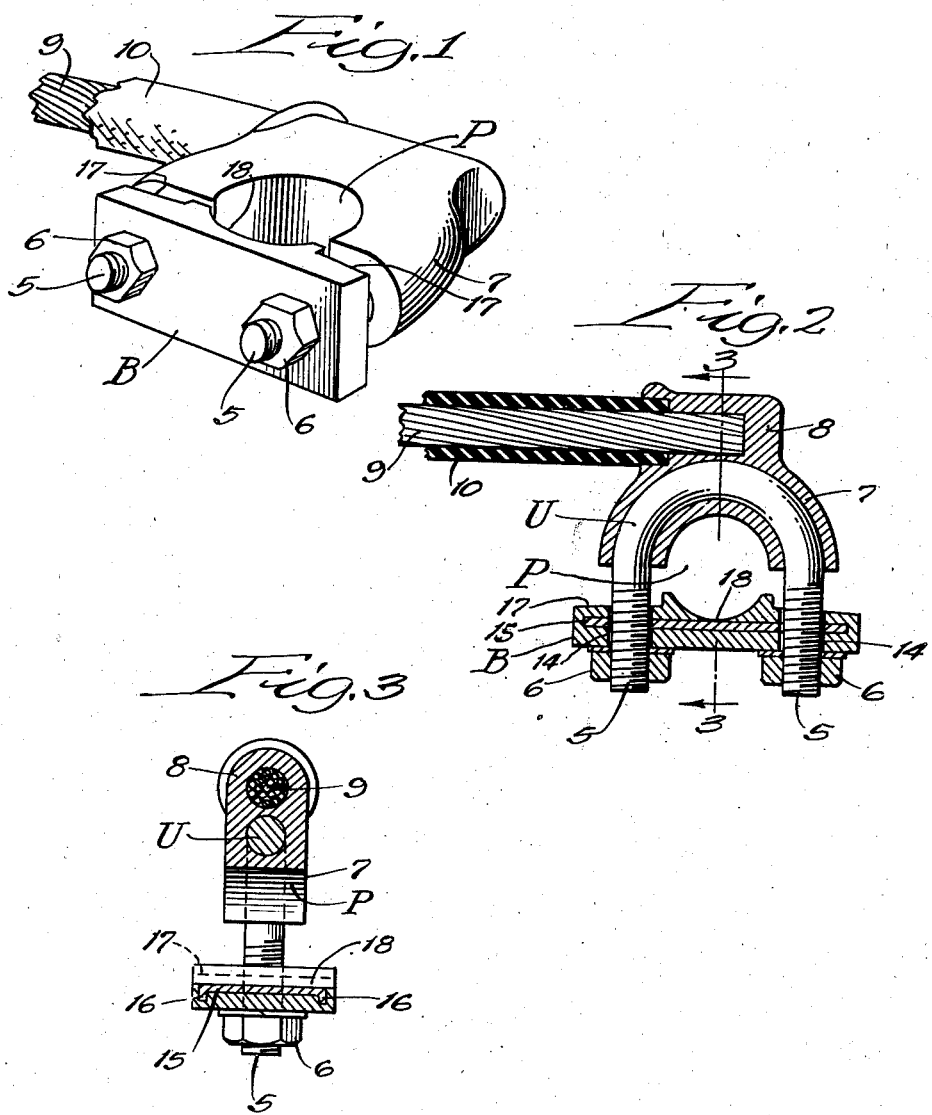
Inventor:
William G. Tenney,
By Dunning & Dunning & Robertson
Attorneys.

Patented Aug. 19, 1947

2,425,764

UNITED STATES PATENT OFFICE 2,425,764

BATTERY TERMINAL

William G. Tenney, Chicago, Ill.

Application October 1, 1945, Serial No. 619,570

1 Claim. (Cl. 173—259)

My invention relates to a terminal attachable to a battery post, the purpose being to provide a simple and effective means of electrical connection between a conductor cable and one of the battery poles.

According to this invention, I utilize a U-bolt which is lead encased through its curved portion, the lead casing also providing an anchorage for one end of the conductor cable which is in electrical connection with the terminal. A U-bolt so encased is adapted to be fitted against one side of a battery post for engagement therewith through approximately 180°. The exposed threaded shanks of the U-bolt extend from the encased portion to points beyond the opposite post side to support between them a cross bar which, with the aid of nuts that are threaded upon the bolt shanks, may be clamped tightly against the post. In this way, by a simple and inexpensive construction, I provide for a very secure and tight electrical connection with the battery post.

A suggestive embodiment of my invention is set forth in the accompanying drawing wherein:

Figure 1 is a view in perspective of the battery terminal electrically connected with one end of a conductor cable;

Fig. 2 is a sectional view through the terminal and the proximate anchored end of the cable; and Fig. 3 is a transverse section taken on line 3—3 of Fig. 2.

The core of the present terminal is a twin shank U-bolt U whose parallel shanks 5 are screw-threaded for the reception of cooperating nuts 6. The curved end of the U-bolt is encased within a housing 7 of lead, or like protective and conducting material, having a head 8 which is socketed for the anchorage therein of one end of a conductor cable 9, usually of copper, which is surrounded by an appropriate insulation 10. In the process of encasing the U-bolt, the cable end and part of its insulation may also be embedded permanently in place, as indicated clearly in Fig. 2.

The U-bolt casing provides in effect an arcuate fitting which is adapted to engage, for perhaps 180°, the post P forming one pole of a battery. When so fitted to the post, the threaded shanks of the bolt will extend along opposite sides of the post and therebeyond in position to support a bar B having openings 14 to receive the bolt shanks. The bar may be advanced to bear against the post on the side thereof which is opposite from the encased portion of the U-bolt. As shown the bar comprises a steel core 15, desirably arched lengthwise or flanged at 16 along its opposite long edges for longitudinal reenforcement, the core being encased within a lead housing 17 whereon is formed an arcuate seat 18 adapted to snugly engage the post. Pressure from the nuts 6, when advanced upon the threaded shanks of the U-bolt, will force the cross-bar tightly against the post, producing a reactive tightening of the U-bolt fitting against the opposite side thereof.

The present terminal is exceedingly simple and sturdy. The composite structure of the fitting and bar endows each with ample strength and desirable electrical contact properties. Only a minimum amount of lead or other equivalent material need be employed for encasing purposes. The applied forces are such as to obviate any bending or distortion of the U-bolt. An electrical connection once established by use of the present fitting will continue indefinitely with little or no attention or checking over a long period of service.

I claim:

A battery terminal comprising a twin shank U-bolt, a curved lead casing surrounding the curved end of the U-bolt and provided exteriorly thereof with a head having an anchorage for one end of a cable, the curved casing between the shanks of the bolt providing a seat into which a battery post may be fitted, a bar extending across the U-bolt shanks and comprising a reinforcing core having openings receiving the shanks of the U-bolt and a casing of lead surrounding the core and formed with a seat cooperating with the seat of the curved casing for engaging the battery post, and a pair of nuts on the bolt shanks for advancing the bar against the battery post.

WILLIAM G. TENNEY.

REFERENCES CITED

The following references are of record in the file of this patent:

UNITED STATES PATENTS

| Number | Name | Date |
|---|---|---|
| 2,156,965 | Borden | May 2, 1939 |
| 2,161,692 | Andre | June 6, 1939 |
| 2,176,060 | Carlson | Oct. 17, 1939 |
| 2,215,415 | Wolcott | Sept. 17, 1940 |
| 1,993,968 | Lee | Mar. 12, 1935 |